United States Patent
Bonnet

[15] 3,678,760
[45] July 25, 1972

[54] MAGNETIC SUSPENSION DENSIMETER INCLUDING MEANS TO VARY FLOAT VOLUME AND WEIGHT

[72] Inventor: Jean-Loup Bonnet, Verrieres-Le-Buisson, France

[73] Assignee: Schlumberger Technology Corporation, New York, N.Y.

[22] Filed: Feb. 19, 1970

[21] Appl. No.: 116,847

[30] Foreign Application Priority Data

Feb. 19, 1970 France .................. 7005884

[52] U.S. Cl. ................................................. 73/453
[51] Int. Cl. ................................................ G01n 9/08
[58] Field of Search ............... 73/32, 437, 451–454

[56] References Cited

UNITED STATES PATENTS 2,981,111  4/1961  McIlwaith et al. ............... 73/453
3,316,767  5/1967  Leibert ................................. 73/453
3,407,666  10/1968  Glassey ........................... 73/453 X

*Primary Examiner*—Richard C. Queisser
*Assistant Examiner*—C. E. Snee, III
*Attorney*—Ernest R. Archambeau, Jr., William J. Beard, Stewart F. Moore, Edward M. Roney and William R. Sherman

[57] ABSTRACT

An illustrative embodiment of the present invention includes methods and apparatus for making in situ determinations of the density or specific gravity of fluids in a well borehole. A magnetically suspendable float type densimeter carried on a sonde is suspended in the borehole and a series of three measure currents to the suspension coils made. A first measure of the float together with an internal and an external inertia block is combined with second and third measures made with only the internal inertia block and then only the external inertia block influencing the measure current. The three measure current signals are then combined to derive a signal proportional to the fluid density which may be recorded as a function of borehole depth.

11 Claims, 6 Drawing Figures

Patented July 25, 1972
3,678,760
3 Sheets-Sheet 1
FIG. 1
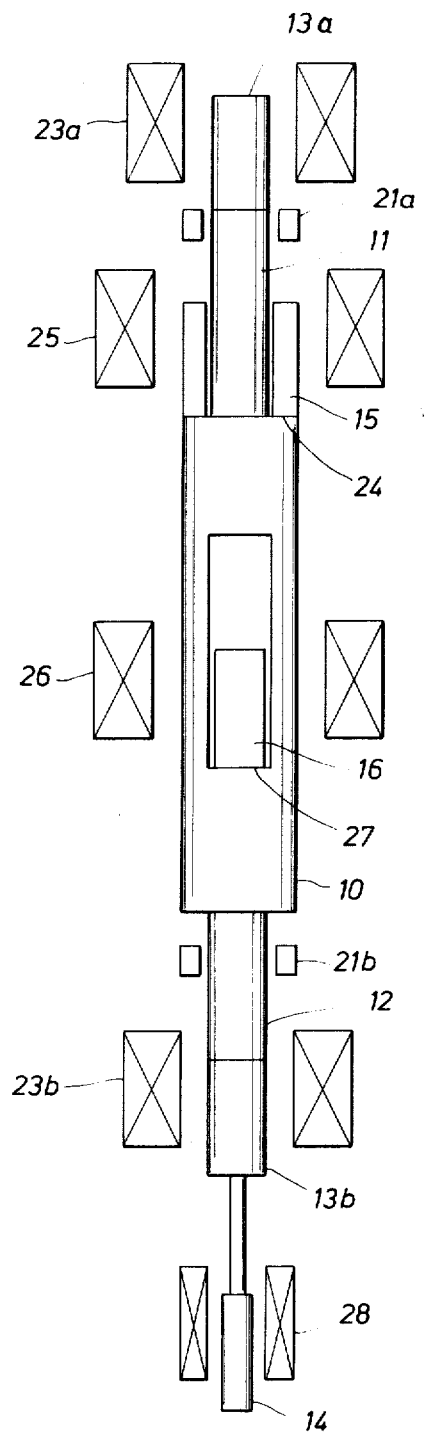
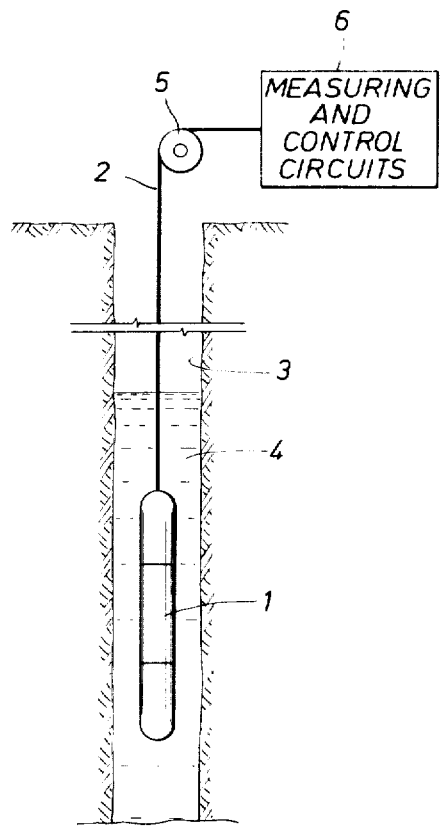
FIG. 4
Jean-Loup Bonnet
INVENTOR
BY William J. Bond
ATTORNEY

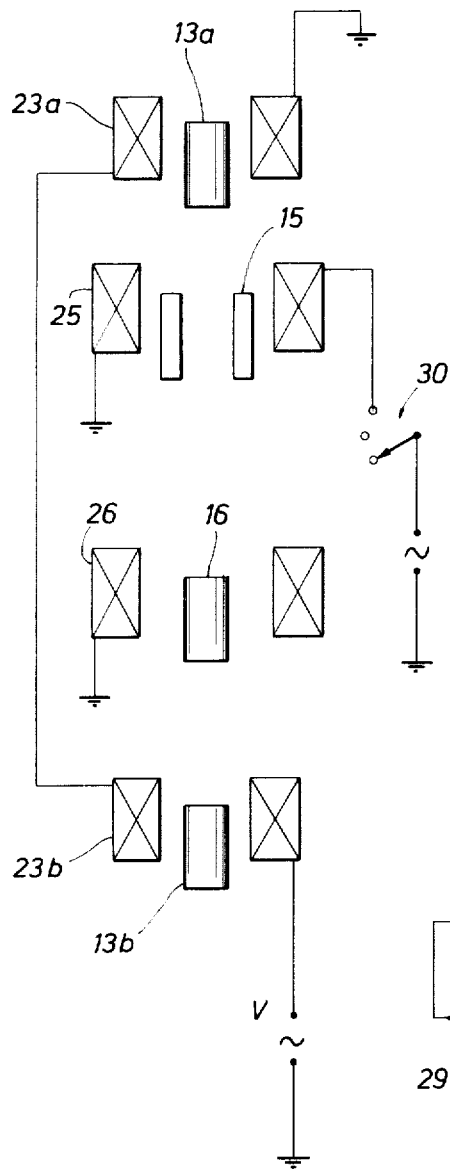
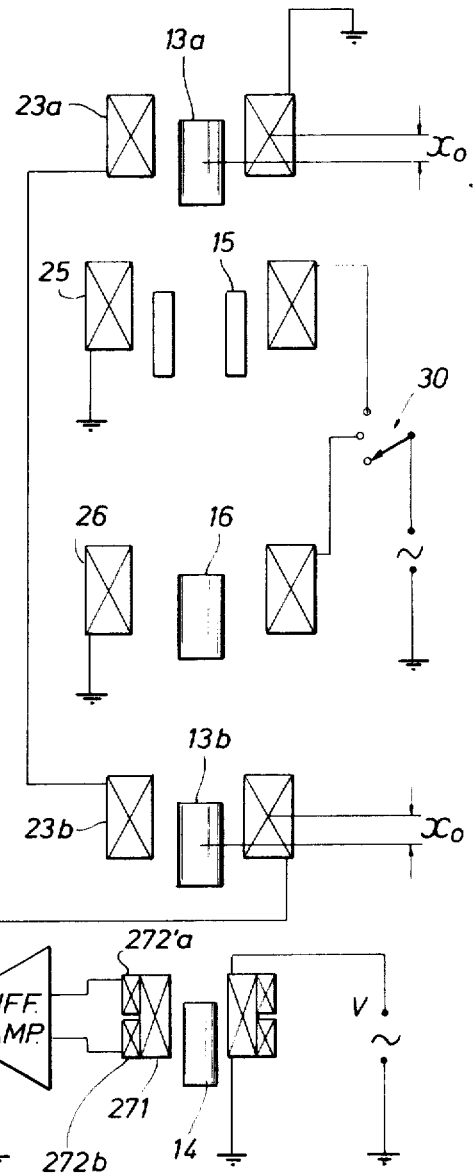
Jean-Loup Bonnet
INVENTOR
BY William J Band
ATTORNEY

Jean-Loup Bonnet
INVENTOR

BY
ATTORNEY

MAGNETIC SUSPENSION DENSIMETER INCLUDING MEANS TO VARY FLOAT VOLUME AND WEIGHT

BACKGROUND OF THE INVENTION

The present invention relates to borehole measurements and more particularly to methods and apparatus for measuring the density or specific gravity of fluids in a borehole.

In the prior art, several different types of fluid densimeters are known. For example, the apparatus described in U.S. Pat. No. 3,455,157 which is assigned to the assignee of the present invention has proven to be very useful. However, such prior art fluid density or specific gravity measuring apparatus have had the drawback of requiring surface calibration, including a zero adjustment and an adjustment of sensitivity of the apparatus. There is a substantial risk of having the surface adjustments disturbed during the lowering of the apparatus into the borehole due to the harsh environmental conditions such as the increased temperature and pressure encountered in logging or making borehole measurements. Additionally, high shock loads encountered in lowering the tool into the well bore to make the measurements can disturb the surface calibration.

Accordingly, an object of the present invention is to eliminate these previous surface calibrations by providing a method and apparatus permitting direct utilization of a float-type densimeter.

Another object of the invention is to provide a fluid densimeter for borehole use which eliminates the shortcomings of the prior art by being calibrated in situ in the borehole.

BRIEF DESCRIPTION OF THE INVENTION

In accordance with these objects, a densimeter is provided having a float capable of being positioned by a solenoid activated by a measuring current. At the equilibrium position of the float when immersed in a fluid, the current required to balance the float against the force of gravity and the force of buoyancy of the borehole fluid is a linear function of the float's apparent weight in the borehole fluid (i.e. is of the form $F=aX+b$). The float is provided with an external inertia block of known mass and volume which is exposed to the borehole fluid. The float is also provided with an internal inertia block having the same mass as the external block and which is not exposed to the borehole fluid.

The measurement method of the present invention may be carried out in three phases. First, the measurement current required to balance the forces acting on the float with the float either completely loaded or completely unloaded with the two inertia blocks is measured. Secondly, the measurement current required to balance the forces acting on the float when loaded with one inertia block is measured. Finally, the measurement current required to balance the forces acting on the float while loaded with the other of the two inertia blocks is measured. The three current measures made in each of these position are then combined to eliminate the two unknown parameters ($a$ and $b$) of the linear function.

Apparatus in accordance with the invention for performing the measuring process just described further comprises a sonde or housing provided with means for guiding the float member in an axial direction. The float moreover is provided with at least one ferromagnetic core attached to a main float body member. The previously mentioned inertia blocks are guided coaxially with the float body member and are at least partially made of magnetic materials. Plural solenoids are mounted on the sonde in positions suitable for interacting with the ferromagnetic core of the float body member and with the magnetic inertia blocks. Power supply means and switching means for energizing any of the solenoid windings to interact with either of the inertia blocks or with the suspension coil which interacts with the main body member of the float are also provided.

At least two variations of the basic method of the present invention exist. Each of these variations of the measurement technique permits the current to be made a linear function of the apparent weight of the float in the borehole fluid. Consequently, it is possible to adapt structure according to either of these methods to provide a densimeter according to the principles of the present invention.

The invention is pointed out with particularity in the appended claims. The methods and apparatus thereof will be better understood upon consideration of the following detailed description in connection with the appended drawings in which:

BRIEF DESCRIPTION OF THE DRAWINGS

FIG. 1 is a schematic view of a fluid densimeter according to the principles of the present invention;

FIGS. 2A and 2B are schematic diagrams showing the basic electrical circuitry of two embodiments of the densimeter of FIG. 1;

FIG. 4 is a schematic view of a borehole showing a logging tool in which the specific gravity or density measurement is being carried out in accordance with the principles of the invention.

DESCRIPTION OF THE PREFERRED EMBODIMENTS

Figure 3A:
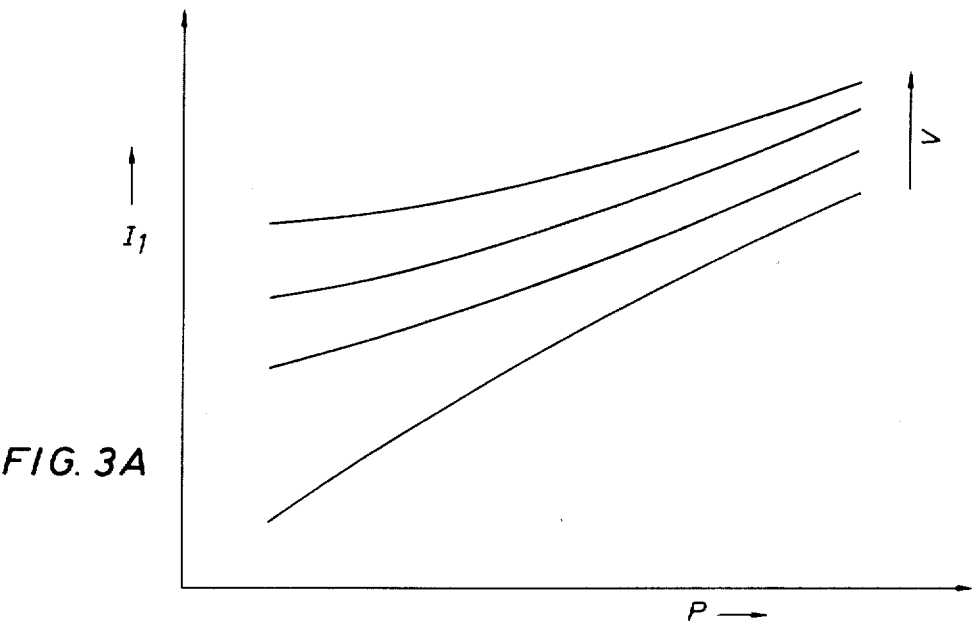
FIGS. 3A and 3B are graphs giving families of curves $I(P)$ of the measuring current as a function of the apparent weight of the float of the densimeter, these families of curves being plotted as functions of the AC voltage $V$ of the power supply of the float suspension windings and the longitudinal offset $x_o$ of the float in the equilibrium position in relation to the suspension winding.

Referring initially to FIG. 4, a well logging tool 1 is shown suspended via a wireline 2 in a fluid filled well bore 3 filled with a borehole fluid 4 whose density is to be measured as a function of borehole depth. A conventional winch (not shown) and sheave arrangement 5 is used to raise and lower the sonde 1 in the borehole. Measuring and control circuitry 6 shown at the surface is provided for supplying power and switching control arrangements to the downhole tool as well as for performing computations to be subsequently described. It will be appreciated by those skilled in the art that the logging tool or sonde 1 comprises a body member or housing and a measuring arrangement which will be discussed with respect to the other figures for measuring the fluid density and may also comprise additional apparatus for measuring other borehole parameters of interest such as temperature, pressure or radiation.

Referring now to FIG. 1, the fluid densimeter of the borehole tool of FIG. 4 is shown in more detail. This includes a float type densimeter comprising a non-magnetic central body member 10 having two cylindrical end portions 11 and 12, each having the same cross section reduced in relation to that of the central body member 10. These end portions of the float have respectively two cores 13a and 13b of the same cross sectional area and made of a magnetic material. Additionally, the lower end of the central body member 10 may be provided with a moving core 14 whose function will be described subsequently.

Two inertia blocks 15 and 16 formed of a magnetic material are carried by the central body member 10 of the float. The first inertia block 15 is of annular cylindrical shape and is normally supported by the upper shoulder 24 of the central body member 10 of the float. The second inertia block 16 is carried in a closed hollow portion of the central body member 10 of the float and is normally supported by the horizontal bottom 25 of the hollow internal chamber of the central body member 10.

While not shown in the drawing of FIG. 1, it will be understood that these structures are supported by the main body member or housing of the sonde. Two guide collars 21a and 21b are provided to axially align the cylindrical end portions 11 and 12 of the float member. These guide collars are fitted about the movable float member with sufficient clearance to allow ready movement of the float in a vertical direction but closely enough to prevent large deviations in the orientation of the float from axial alignment with the housing of the tool. Also supported by the housing of the tool are two measurement windings 23a and 23b of the solenoid type which are designed to carry suitable current for suspending the float in opposition to the force of gravity and the buoyance force supplied by the borehole fluid in which the tool is suspended.

Solenoid movement control windings 25 and 26 are also supported by the tool housing and are positioned with respect to the non-magnetic portion of the float member to permit interaction of their magnetic fields with the inertia blocks (which are made of a magnetic material) without influencing the movement of the float central body member 10. Thus, either of the inertia blocks 15 or 16 may be independently held in suspension by its respective control winding 25 or 26 and the weight of the float member 10 increased or decreased thereby. The magnetic extension 14 affixed to the lower end of the body member 10 of the float together with solenoid coil 28 of FIG. 1 comprises a differential transformer of which the extension 14 is a movable core. This is shown in more detail in FIG. 2B. In practice the solenoid windings 28 comprise a plurality of transformer windings which will be discussed subsequently with respect to FIG. 2B.

Referring now to FIG. 2A, one embodiment of apparatus for implementing the method of the present invention for measuring the density of borehole fluid is shown, In the apparatus embodiment shown in FIG. 2A and whose response curves are shown in FIG. 3A, the differential transformer apparatus at the lower end of the float is not used. The suspension windings 23a and 23b of the central body member of the float 10 of FIG. 1 are supplied directly by an AC voltage source of constant value V and of a typical frequency of 50 to 60 Hertz. For any particular power supply voltage V the current in the suspension windings 23a and 23b of the float is an increasing function of the floats apparent weight (actual weight minus the buoyancy force). This is due to the fact that the greater the apparent weight of the float the lower is its equilibrium position for a given voltage in the coil arrangement 23a and 23b. Consequently the lower the equilibrium position is in the suspension coils the less ferromagnetic mass is present inside these windings and therefore the induction of the windings is lower. It is therefore possible to find a power supply voltage value V for which the current $I_1$ in the windings is a linear function of the bulk density P of the float. That is:

$$P = K_1(I_1 - I_{01}) \qquad 1$$

where $K_1$ is the coefficient of proportionality and $I_{01}$ is the minimum extrapolation current at zero weight. A family of such curves exists for increasing constant power supply voltages V in the manner shown in FIG. 3A. In practice, it has been discovered that if the power supply voltage V is increased gradually, that at a certain value of V the linearity gradually becomes worse due to the magnetic saturation of the ferromagnetic core portion of the float. This, of course, causes a decrease of sensitivity which is undesirable. Thus, it is desirable to choose the voltage V as low as possible. Of course at all times this is limited by the need to give V a value which is at least sufficient to ensure the suspension of the float at its maximum apparent weight (i.e. as in air or a gas filled borehole).

Figure 3B:
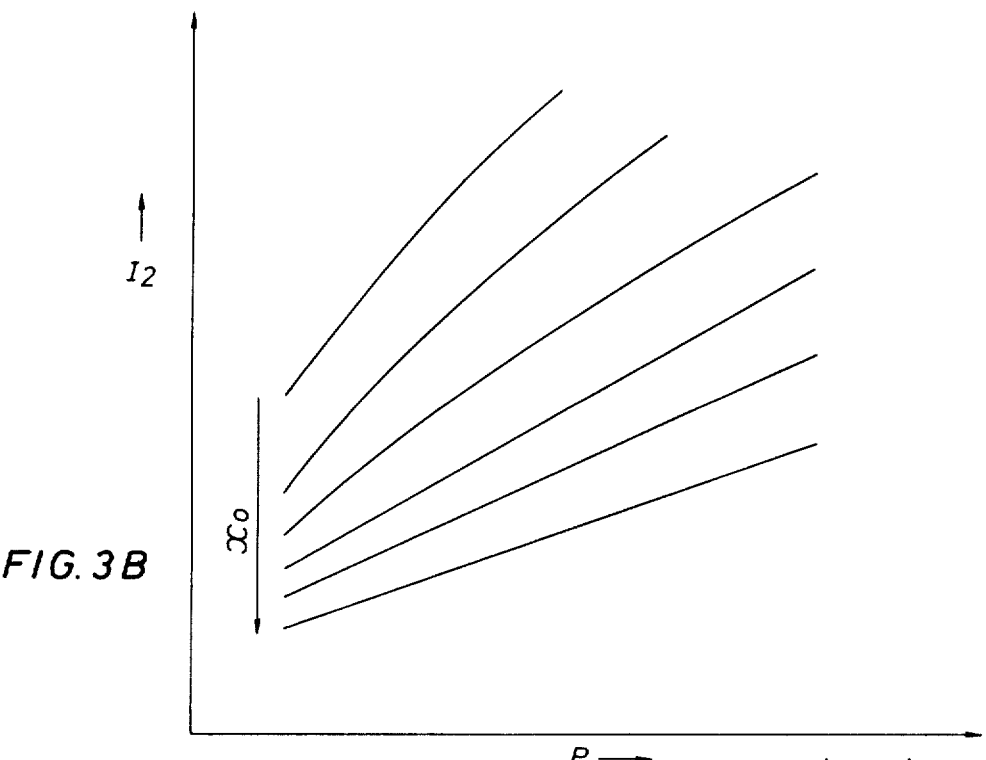

In the second apparatus embodiment shown in FIG. 2B whose response is plotted in FIG. 3B, the suspension windings 23a and 23b are supplied with regulated variable current of any type either pure DC or AC or advantageously DC with a low frequency AC component. The amount of this current is determined by a signal furnished by a sensor of the displacement of the float in a servo or feedback type arrangement which is connected in such a manner as to keep the float suspended in a fixed position. This position is defined by the offset distance $x_0$ separating the median plane of each suspension winding from that of the corresponding magnetic core portion of the float central body member 10 as shown. In practice, the current in the suspension windings is a function of the output voltage of the differential transformer arrangement at the lower end of the float comprising the core member 10 and solenoid windings 271, 272a and 272b. A variable voltage source V is connected to the primary winding of the differential transformer 271. A differential amplifier 29 is connected across the pair of secondary windings 272a and 272b of the differential transformer apparatus. Depending upon the position of the core member 14 in the primary winding 271, which of course is proportional to the distance $x_0$, the voltage across the secondary windings 272a and 272b varies. This voltage difference is amplified by the differential amplifier 29 and supplied to the suspension windings 23a and 23b so as to keep the magnetic core portions of the float central body member 13a and 13b in a fixed relationship $x_0$ with respect to the suspension coils 23a and 23b of the transformer.

For a given offset, $x_0$, the current in the suspension windings of the float is then an increasing function of its apparent weight in the manner shown by the graphs of FIG. 3b. This is due to the fact that the greater the apparent weight of the float, the greater the force required to keep it at a given equilibrium position. Offset values of $x_0$ may be found for which the current suspending the float central member is a linear function of the apparent weight P of the float. That is:

$$P = K_2(I_2 - I_{02}) \qquad 2$$

where $K_2$ is a coefficient of proportionality and $I_{02}$ is the minimum extrapolation current at zero weight.

If the value of the offset $x_0$ is gradually decreased it is observed that at a certain value the linearity gradually becomes worse, although the sensitivity of the device increases. It is thus desirable to choose the offset $x_0$ as high as possible within the limits allowed by the need to maintain sufficient sensitivity.

The two sets of apparatus described with respect to FIGS. 2A and 2B and curves 3a and 3b have in common the fact that by suitably choosing one basic parameter (the AC power supply voltage V in one, and the offset $x_0$ between the core of the float and the suspension windings in the other) the current in the suspension windings is a linear function of the apparent weight of the float. That is to say in either case the apparent weight P is a function of form:

$$P = K(I - I_0) \qquad 3$$

where $K$ is a generalized constant of proportionality and $I_0$ is a generalized zero point calibration current.

In either embodiment, switching means 30, which may be controlled suitably from a remote surface control unit, is used to make a series of three measurements of the suspension current. The first measurement is carried out with both inertia blocks comprising a portion of the float weight (i.e., inertia blocks 15 and 16 riding on their respective supporting surfaces of the float). In this condition the equilibrium equation for suspending the float is given by:

$$(M + 2m)g - (V + v)\rho g = K(I_1 - I_0) \qquad 4$$

where $M$ is the mass of the central body member 10 of the float not including the inertia block, $m$ is the mass of each of the inertia blocks, $g$ is the acceleration due to gravity, $V$ is the volume of float central body member 10 without the external inertia block included, $v$ is the volume of the external inertia block, and $\rho$ is the density of the fluid in which the float is immersed.

The second step in the measurement sequence is carried out by supplying via switching means 30 the inertia block control winding 26 with a current sufficient to suspend the inertia block 16 in the magnetic field of the winding 26. The apparent weight of the float is thus reduced by a known mass which is not influenced by the action of the borehole fluid since the inertia block 16 is carried internally to the float central body member 10 and is therefore not affected by the buoyant force of the fluid. The equilibrium equation under this condition then becomes:

$$(M+m)g - (V+v)\rho g = K(I_2 - I_0) \quad 5$$

where again the symbols stand for the same quantities as related to respect to Equation 4.

The third measurement of the measurement sequence is carried out by supplying, via the switching means 30, the solenoid control winding 25 with a current sufficient to suspend the inertia block 15 in the magnetic field of the control winding 25. Under this condition the apparent weight of the central body member 10 of the float is reduced by an amount which is dependent on the buoyancy effect of the fluids (since the inertia block 15 is exposed to the borehole fluid in which the float is immersed). Under this condition the equilibrium equation becomes:

$$(M+m)g - V\rho g = K(I_3 - I_0) \quad 6$$

where again the symbols represent the same quantities previously described with respect to Equations 4 and 5.

It would be apparent to those skilled in the art that by simultaneously supplying control suspension windings 25 and 26 of the apparatus with current, that both inertia blocks 15 and 16 could be suspended in their respective magnetic fields and a fourth equation for equilibrium derived from this condition. This however is not necessary as only three unknowns exist in the system which may be solved by simultaneously applying a linear combination of Equations 4, 5 and 6.

The system of three Equations 4, 5 and 6 with three unknowns $K$, $I_0$ and $\rho$ makes it possible to eliminate the first two and to calculate the third in terms of the measurement currents $I_1$, $I_2$ and $I_3$. For example, suitable algebraic manipulation will yield the following result for $\rho$, the unknown density of the fluid:

$$\rho = m/v \cdot (I_3 - I_2/I_1 - I_2) \quad 7$$

It should be noted with respect to Equation 7 that the mass $M$ and the volume $V$ of the float proper do not enter the final expression for $\rho$ the fluid density and consequently need not be determined. To increase the accuracy of the measurement, the ratio $m/v$ is given the smallest possible value in practice. To this end, the external inertia block may include, for example, two portions; one of a relatively dense ferromagnetic material and another of a magnetic material with the smallest possible density. This will insure that the measured current ratio $(I_3 - I_2)/(I_1 - I_2)$ will be relatively large and the measurement then all the more accurate.

It will be appreciated by those skilled in the art that Equation 7 may be implemented in the surface control panel 6 by analog or digital circuitry of types known in the art. Hence such circuitry need not be detailed here. Moreover, other changes and modifications to the apparatus described herein may be made which would be equivalent in the sense that the apparatus would still operate under the basic principles of the invention. Hence, it is the aim in the appended claims to cover all such changes and modifications as come within the true spirit and scope of the invention.

I claim:

1. A process for measuring in situ the density or specific gravity of fluids in a well borehole comprising the steps of:
passing a magnetically suspendable float member through the fluid filled borehole;
providing a sequence of at least three suspension currents through the suspension coils of said magnetically suspendable float member while simultaneously varying the apparent weight and then the apparent weight and volume of said float member;
measuring said three suspension current to provide signals representative of the current required to suspend said float member against the forces of buoyancy and gravity in at least three weight, volume configurations; and
combining said representative signals to generate a signal representative of the density or specific gravity of the borehole fluid.

2. The method of claim 1 wherein the steps are repeated successively at different depth levels in the borehole and the density or specific gravity signal is recorded as a function of the depth of the float in the borehole.

3. The process of claim 1 wherein the step of varying the apparent weight and volume of said float member is performed by magnetically suspending a portion of said float member which is exposed to the borehole fluid independently of the remainder of said float member.

4. The process of claim 1 wherein the step of varying the apparent weight of said float member is performed by magnetically suspending a portion of said float member which is not exposed to the borehole fluid independently of the remainder of said float member.

5. The method of claim 1 wherein the step of combining said representative signals to generate a signal representative of the density or specific gravity of the borehole fluid is performed by forming a linear combination of the three signals representative of the suspension current in the three different weight, volume configurations.

6. Apparatus for measuring in situ the density or specific gravity of fluids in a well borehole comprising:
a body member sized for passage in a well bore;
a magnetically suspendable float member carried by said body member and exposed to the buoyant action of the borehole fluid and mounted for axial motion relative to said body member;
means for varying simultaneously the weight and volume of said float member;
means for varying the weight alone of said float member;
means for measuring the suspension current necessary to suspend said float member in at least three different weight, volume configurations in the borehole fluid and for generating signals representative thereof; and
means for combining said representative signals to provide an output signal representative of the density or specific gravity of the borehole fluid.

7. The apparatus of claim 6 and further including means for moving said body member through the borehole and for recording said output signal as a function of depth in the borehole.

8. The apparatus of claim 6 wherein said means for simultaneously varying the weight and volume of said float member comprises magnetic inertia block means coupled to said member and exposed to the borehole fluid but adapted for movement with respect to said float member and means for supplying magnetic forces to independently suspend said inertia block and to thereby decouple it from said float member.

9. The apparatus of claim 8 wherein the mean composite density of said inertia block is as small as possible.

10. The apparatus of claim 6 wherein said means for varying the weight alone of said float member comprises magnetic inertia block means coupled to said member and not exposed to the borehole fluid but adapted for movement with respect to said float member, and means for supplying magnetic forces to independently suspend said inertia block and to thereby decouple it from said float member.

11. The apparatus of claim 6 wherein said magnetically suspendable float member is suspendable by a magnetic field produced in plural suspension windings, said suspension windings being arranged so that the current required to pass therethrough for suspending said float member is a linear function of the apparent weight of said float member in the borehole fluid.

* * * * *